UNITED STATES PATENT OFFICE.

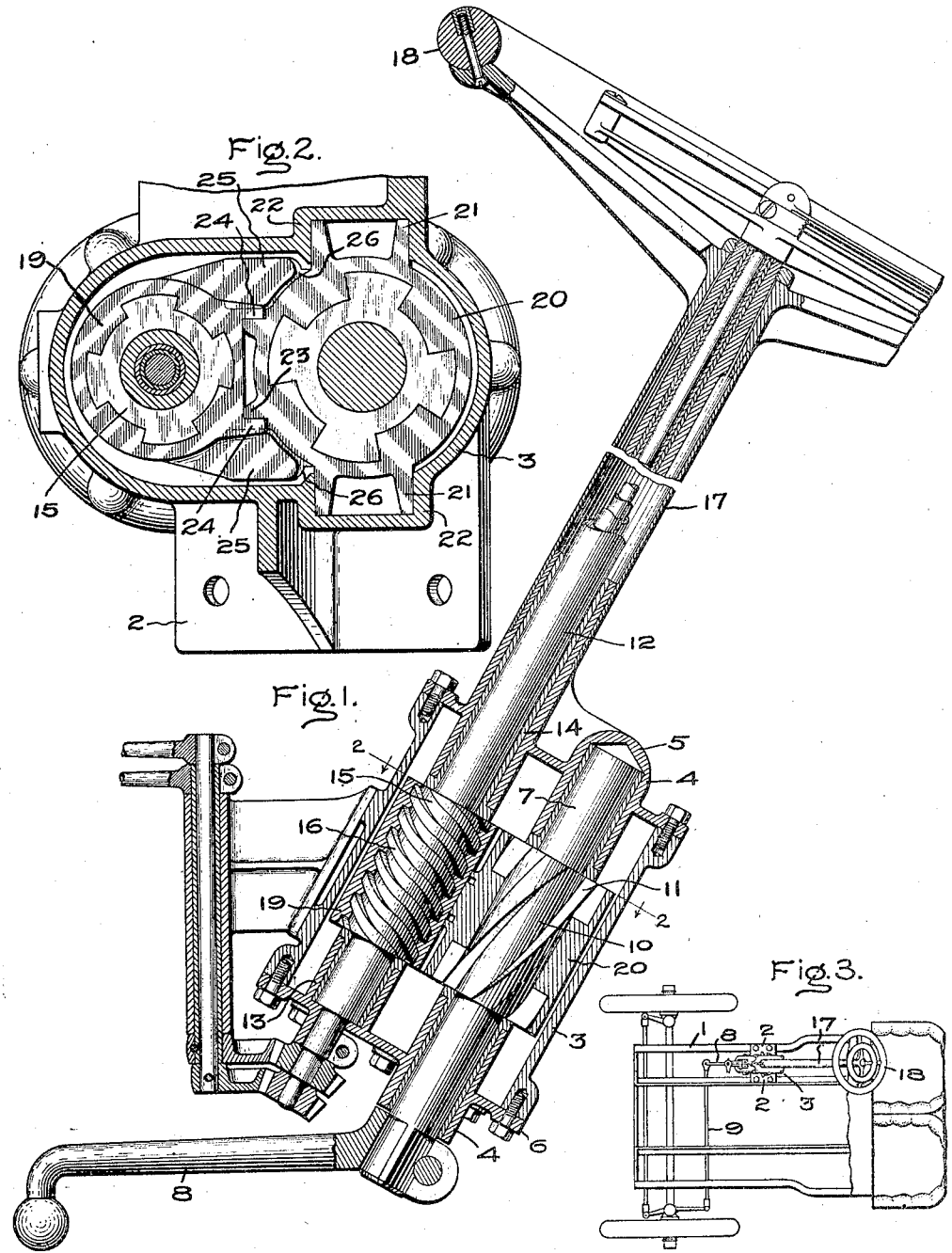

OTTO F. PERSSON, OF LYNN, MASSACHUSETTS, ASSIGNOR TO GENERAL ELECTRIC COMPANY, A CORPORATION OF NEW YORK.

STEERING MECHANISM.

1,091,861.  Specification of Letters Patent.  Patented Mar. 31, 1914.

Application filed October 5, 1907. Serial No. 396,010.

*To all whom it may concern:*

Be it known that I, OTTO F. PERSSON, a citizen of the United States, residing at Lynn, county of Essex, State of Massachusetts, have invented certain new and useful Improvements in Steering Mechanisms, of which the following is a specification.

My invention relates in general to steering mechanism for road vehicles, boats or air ships and is illustrated as applied to a steering mechanism of that type which has a motion-checking device for the purpose of preventing the transmission of shocks due to irregularities in the roadway, from the vehicle wheels to the hand wheel by which they are turned to direct the course of a vehicle.

The object of the invention is to provide a steering mechanism of the type described, which is compact, relatively inexpensive to manufacture, readily adapted to the conditions found in different road vehicles or other apparatus, and having large and ample bearing surfaces for receiving the shocks to which it is subjected, coöperating with the other parts of the mechanism to produce a highly efficient and durable device.

In the accompanying drawing illustrating one embodiment of the invention, Figure 1 is a central section of the apparatus; Fig. 2 is a section on the line 2—2, Fig. 1, looking in the direction of the arrows; and Fig. 3 is a view of an automobile having a portion broken away to show the manner in which the steering mechanism is attached to the frame.

Secured to the frame 1 of the vehicle by means of the flanges 2 is a casing 3 which incloses the parts and efficiently protects them from dirt, etc.

Mounted in the bearings 4 formed in the heads 5 and 6 at the upper and lower ends of the casing is a shaft 7. Attached to the lower end of the shaft is an arm or crank 8, having a connection 9 leading from its outer end to the levers which control the position of the front wheels by which the course of the vehicle is directed. Intermediate the ends of the shaft 7 is an enlarged portion 10 having screw-threads or projections 11 of very coarse pitch. The ends of the enlarged portion 10 are in engagement with shoulders formed on the bearings 4 which prevent the shaft from moving longitudinally but permit it to rotate freely in the bearings.

Mounted in the casing in parallel or substantially parallel relation to the shaft 7 is a shaft 12 supported in a step bearing 13 and a bearing 14 formed on the heads 6 and 5, respectively, of the casing. The shaft 12 has an enlarged portion 15 located between shoulders formed on the ends of the bearings 13 and 14 which prevent it from moving longitudinally but permit it to rotate freely. This enlarged portion has a screw-thread 16 formed on it. The pitch of the screw-thread is much less than that of the thread 11 and the thread itself may be a double, triple, quadruple or other thread, depending upon the conditions found in the particular vehicle to which the mechanism is to be applied. The shaft 12 is extended upward within the steering post 17 and carries on its upper end a steering wheel 18. Mounted within the hollow interior of the shaft are the usual shafts and connections for controlling the operation of the vehicle motor.

Within the casing and in engagement with the screws 11 and 16 is a nut which might be formed as one integral member, but I prefer, for reasons of convenience in manufacturing, assembling and repairing the apparatus, to make this member in two parts, or nuts; the nut 19 engaging the screw 16, and the nut 20 engaging the screw 11. Any movement of the nuts from the neutral position, Fig. 1, causes the wearing surfaces to overrun, preventing shoulders from forming. Board flat guides 21 formed on opposite sides of the nut 20 are arranged in sliding contact with guide-ways 22 formed in the casing, to permit the nut 20 to move longitudinally of the shaft 7 but to prevent it from rotating about the shaft. A guide 23 located on the side of the nut 20 toward the shaft 12 engages corresponding broad flat guides 24 formed on the nut 19 to prevent the two nuts rotating relatively to each other. The area of all of these guides is such that the pressure per square inch thereon due to road strains is very small. Jaws 25 project from the nut 19 toward the nut 20. Lugs 26 on the nut 20 project into the space between the jaws 25 and cause the two nuts to move together in a longitudinal direction. There may be sufficient play between the lugs and the jaws to permit the parallel relation of the shafts to be varied to a limited extent without interfering with the operation of the mechanism. This allows the parts to be made in an interchangeable manner and facilitates their manufacture.

The removable heads 5 and 6 afford access to the parts within the casing for inspection or repair, and also facilitate the assembly of the parts. The interior of the casing may be filled with oil, if desired, so that the screws and nuts are constantly flooded with lubricant. The diameters of the bearings 4, 13 and 14 are such that the nuts 19 and 20 slide or telescope over them as they move to and fro.

In operating the mechanism the shaft 12 and its screw 16 are rotated in either direction by the hand-wheel 18 to move the nut 19 up or down. The screw 16 will be proportioned with respect to the work which is to be done by it. For light vehicles a single rotation of the wheel will generally be found satisfactory for turning the forward wheels from their extreme right position to their extreme left position, or vice versa. With heavier vehicles the screw will be so proportioned that it will take two, three or four turns of the steering wheel to move the vehicle wheels in the above manner. As the nut 19 moves up or down, the nut 20 is moved with it and acts upon the screw 11 to rotate the shaft 7 in either direction. The movement of the shaft is transmitted by the arm 8 to the levers which move the forward wheels as already described. Any shocks transmitted from the road wheels tending to turn the shaft 7, its screw and nut are received by the large bearing surfaces of the guides. The pitch of the screw 11 is such that the component of the forces due to shocks acting in a direction to move the nut axially is so small that it is unable to overcome the resistance to its action and no movement occurs in that direction. In other words, the mechanism is irreversible so that shocks are not transmitted to the steering wheel, and when the driver turns the wheel to a given position, it will remain undisturbed in that position without further effort on his part.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In combination, a shaft, a steering device for rotating the shaft, a second shaft parallel to the first shaft and axially displaced therefrom, a casing in which said shafts are mounted, threaded means carried by both shafts transmitting motion from the first shaft to the second shaft when said first shaft is rotated by the steering device and preventing the transmission of motion from the second shaft to the first, guides on said means, and guideways on the casing coöperating with the guides to prevent said means from rotating and to cause it to move longitudinally.

2. In combination, a shaft, a steering wheel for rotating the shaft, a second shaft, screw-threads on the shafts, and interlocking nuts mounted on the shafts which transmit motion from the first shaft to the second when said first shaft is rotated by the wheel and prevent the transmission of motion from the second shaft to the first.

3. In combination, a shaft, a steering wheel for rotating the shaft, a second shaft, a casing in which said shafts are mounted, screw-threads on the shafts, interlocking nuts mounted on the shafts which transmit motion from the first shaft to the second when said first shaft is rotated by the wheel and prevent the transmission of motion from the second shaft to the first, guides on said nuts, and guideways on the casing coöperating with the guides to prevent said nuts from rotating and to cause them to move longitudinally.

4. In combination, a shaft, a steering wheel for rotating the shaft, a second shaft, and nuts interlocked against independent longitudinal and angular movement and having dissimilar screw-threads which are mounted on the shafts and transmit motion from the first shaft to the second when said first shaft is rotated by the wheel and prevent the transmission of motion from the second shaft to the first.

5. In a steering mechanism, the combination of a steering wheel, a shaft actuated by the wheel, a casing in which the shaft is mounted, means mounted for longitudinal movement within the casing and having two substantially parallel openings provided with screw-threads of different pitch, a screw-thread on the wheel-shaft which engages the threaded interior of the opening having the thread of finer pitch to move said means when the wheel is rotated, a second shaft substantially parallel to the wheel shaft, a screw-thread on the second shaft which is engaged by the threaded interior of the opening having the thread of coarser pitch to rotate said shaft as said means is moved longitudinally, guides on said means, and guide-ways on the casing coöperating with the guides to prevent said means from rotating and to cause it to move longitudinally.

6. In a steering mechanism, the combination of a steering wheel, a shaft actuated by the wheel, a casing in which the shaft is mounted, a two-part nut mounted for longitudinal movement in the casing, a screw-thread on the shaft engaging the threaded interior of one part of the nut, a second shaft parallel to the first shaft, a screw-thread on the second shaft, the second part of the nut being adjacent the first part, moving in the same direction therewith and provided with a screw-thread which engages the thread on the second shaft to drive the latter when the nut is moved longitudinally by rotating the steering wheel, and a connecting member extending from the second shaft.

7. In a steering mechanism for vehicles, the combination of a casing, a steering-wheel shaft mounted in the casing, a screw-thread on a portion of the shaft, a nut in engagement with the thread, a second shaft mounted in the casing in substantially parallel relation to the first shaft, a screw-thread on the second shaft, a nut in engagement with the screw-thread on the second shaft, oppositely-located guides on the last-named nut, guide-ways on the casing for receiving said guides, means arranged between the two nuts which causes them to move together but permits the parallel relation of the shafts to vary to a limited extent, and a connecting member extending from the second shaft.

8. In a steering mechanism for vehicles, the combination of a casing, a steering-wheel shaft mounted in the casing, a screw-thread on a portion of the shaft, a nut in engagement with the thread, a second shaft mounted in the casing in substantially parallel relation to the first shaft, a connecting member extending from the second shaft, a screw-thread on the second shaft, a nut in engagement with the screw-thread on the second shaft, guide-ways on the casing, oppositely-located guides on the last-named nut which coöperate with the guide-ways to prevent the nut from turning and to receive the shocks transmitted from the running gear, means between the nuts which prevents them from rotating relatively to each other, jaws on one of the nuts, and projections on the other nut which engage said jaws to cause the two nuts to move together in an axial direction when the wheel is rotated but permit the parallel relation of the shafts to vary to a limited extent without interfering with the operation of the apparatus.

9. In a motion-checking device, the combination of a casing, a shaft mounted in the casing, a coarse pitch screw-thread on the shaft, a longitudinally-movable nut engaging the screw-thread to rotate the shaft, a steering element connected to said shaft, a second shaft mounted in the casing parallel to the first shaft, a second nut connected to the first nut for longitudinal movement therewith, a screw-thread on the second shaft which engages the second nut to move it longitudinally, means for rotating the second shaft, and journal bearings for the shafts carried by the casing and over which the nuts telescope as they move to and fro.

10. In a motion-checking device for vehicles, the combination of a casing, a shaft mounted in the casing, an arm on the shaft, a connecting member extending from the arm, a coarse pitch screw on the shaft, a nut guided for longitudinal movement in the casing and engaging the screw to rotate the shaft, a second shaft mounted in the casing parallel to the first shaft, a steering wheel on the second shaft, a second nut connected to the first nut for longitudinal movement therewith, means for preventing the relative rotation of the nuts, and a screw on the second shaft which engages the second nut to move it longitudinally.

11. In a motion-checking device, the combination of a hollow casing having longitudinal guide-ways in its inner surface, a nut provided with oppositely-located guides on its periphery extending substantially the length of the nut and having large bearing surfaces in engagement with said guide-ways, a shaft passing through the nut, bearings on the casing for the shaft, a screw-thread on the shaft in engagement with the nut, the pitch of the thread being such that by moving the nut axially the shaft is rotated but a sudden force tending to rotate it is unable to shift the nut, a second nut and screw for moving the first nut axially to rotate its screw-shaft, a connection between the two nuts, a second shaft parallel to the first on which the second screw is mounted, and means for rotating said second shaft.

12. In a steering mechanism for vehicles, the combination of a casing, a steering-wheel shaft mounted in the casing and having a screw-thread on a portion thereof, a nut in engagement with the thread, a second shaft mounted in the casing in parallel relation to the first shaft and having a screw-thread of coarse pitch on a portion thereof, a nut in engagement with the screw-thread on the second shaft, diametrically opposite guides on the nut that engage the casing and prevent rotation while permitting longitudinal movement of the nut, means arranged between the two nuts at right angles to the guides that prevent rotation and longitudinal movement of the nuts relative to each other, and a connecting member extending from the second shaft.

13. In combination, a casing, a shaft journaled in the casing, a steering wheel for rotating the shaft, a second shaft in the casing, screw-threads on said shafts, nuts mounted to run on said threads and rigidly interlocked to each other whereby motion may be transmitted from the first named shaft through said nuts to the second named shaft, and a connecting member fastened to the second named shaft.

In witness whereof, I have hereunto set my hand this third day of October, 1907.

OTTO F. PERSSON.

Witnesses:
JOHN A. MCMANUS, Jr.,
HENRY O. WESTENDARP.